US012699912B2

(12) United States Patent
Mishra et al.

(10) Patent No.: US 12,699,912 B2
(45) Date of Patent: Aug. 4, 2026

(54) OPTIMIZED QUANTUM TRANSDUCTION

(71) Applicant: The Board of Trustees of the Leland Stanford Junior University, Stanford, CA (US)

(72) Inventors: Sattwik Deb Mishra, Stanford, CA (US); Rahul Trivedi, Stanford, CA (US); Jelena Vuckovic, Palo Alto, CA (US); Amir H. Safavi-Naeini, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 928 days.

(21) Appl. No.: 17/715,748

(22) Filed: Apr. 7, 2022

(65) Prior Publication Data

US 2022/0327415 A1     Oct. 13, 2022

Related U.S. Application Data

(60) Provisional application No. 63/171,931, filed on Apr. 7, 2021.

(51) Int. Cl.
G06N 10/40     (2022.01)

(52) U.S. Cl.
CPC .................................. G06N 10/40 (2022.01)

(58) Field of Classification Search
CPC ............. G06F 3/147; G06F 2203/0381; G06F 3/04883; G06F 15/16; G06F 9/5027; G06F 3/1423; G06F 3/0487; G06F 3/013; G06F 3/167; G06F 15/00; G06F 16/2465; G06F 16/9024; G06F 9/3877; G06F 3/017; G06F 3/046; G06F 3/04812; G06F 3/04842; G06N 20/00; G06N 10/40; G06N 3/0464; G06N 3/045; G06N 10/70; G06N 3/08; G06N 3/02; G06N 10/00; G06N 5/022; G06N 5/02; G06N 20/10; G06N 5/04;

(Continued)

(56) References Cited

U.S. PATENT DOCUMENTS

| | | | | |
|---|---|---|---|---|
| 10,007,885 | B1* | 6/2018 | Gorshkov | ............ G01N 24/008 |
| 2012/0212375 | A1* | 8/2012 | Depree, IV | ........ H01Q 15/0086 |
| | | | | 977/762 |

(Continued)

OTHER PUBLICATIONS

Gazzano et al., "Quantum dot resonant-fluorescence linewidth narrowing and enhanced intensity", 2017, arXiv:1702.03947v1.

(Continued)

*Primary Examiner* — Binh C Tat
(74) *Attorney, Agent, or Firm* — LUMEN PATENT FIRM

(57) ABSTRACT

Improved quantum transducers based on ensembles of quantum emitters are provided. This work improves the efficiencies of such transducers by compensating for the detrimental effects of inhomogeneous broadening of transition frequencies in such systems. This approach is built upon the insight that the temporal shape of the drive supplying the energy required for transduction can be experimentally tuned. Hence, it is an additional degree of freedom for designing efficient transducers. We pose the design of the drive as a scattering theory optimization problem, where the transduction efficiency is the quantity being maximized, and employ numerical optimization techniques to solve it.

7 Claims, 12 Drawing Sheets

(58) Field of Classification Search
CPC ................ G06N 10/20; H01L 2924/00; H01L
2924/00012; H01L 2924/00014
USPC .................................................. 716/100–106
See application file for complete search history.

(56) References Cited

U.S. PATENT DOCUMENTS

2015/0234122 A1* 8/2015 Andle ..................... H02M 3/07
257/432
2019/0049495 A1* 2/2019 Ofek .................. G01R 33/1284
2020/0395448 A1* 12/2020 Conradson ........... H10D 48/383

OTHER PUBLICATIONS

Dong et al., "Quantum control theory and applications: a survey",
2010, IET Control Theory Appl., vol. 4, Iss. 12, pp. 2651-2671.
Koch, "Controlling open quantum systems: tools, achievements,
and limitations", 2016, J. Phys.: Condens. Matter 28 213001 (13pp).
Gorshkov et al., "Photon storage in Lambda-type optically dense
atomic media. IV. Optimal control using gradient ascent", 2008,
Physical Review A 77, 043806.

* cited by examiner

OPTIMIZED QUANTUM TRANSDUCTION

CROSS REFERENCE TO RELATED APPLICATIONS

This invention was made with Government support under contract DE-AC02-76SF00515 awarded by the Department of Energy and under contract DE-SC0019174 awarded by the Department of Energy. The Government has certain rights in the invention.

FIELD OF THE INVENTION

This invention relates to quantum transducers.

BACKGROUND

Superconducting quantum circuits are a promising platform for Noisy Intermediate-Scale Quantum (NISQ) computation in the near future. However, these circuits operate at microwave frequencies and direct quantum communication between distant superconducting quantum systems is precluded by the high propagation loss of microwave photons over commercial microwave cables. Efficient, coherent, and noise-free transduction of single photons from microwave to optical frequencies (and vice versa) is a path towards realizing the coupling of distant superconducting quantum systems over optical fibers and, eventually, the networking of superconducting quantum computers and distributed quantum computing.

Typically a single quantum emitter will not provide sufficient efficiency in quantum transducers for applications as described above. The use of several quantum emitters (i.e. an ensemble of quantum emitters) to improve efficiency is complicated by the inhomogeneous broadening that is present in any practical ensemble of quantum emitters. Here inhomogeneous broadening refers to different emitters in the ensemble having different resonant frequencies.

Accordingly, it would be an advance in the art to provide improved quantum transducer efficiency by mitigating the effect of this inhomogeneous broadening.

SUMMARY

Our work pertains to microwave-to-optical quantum transducers based on ensembles of quantum emitters and solves the problem of improving the efficiencies of such transducers by compensating for the detrimental effects of inhomogeneous broadening of transition frequencies in such systems.

Our approach is built upon the insight that the temporal shape of the drive supplying the energy required for transduction can be experimentally tuned. Hence, it is an additional degree of freedom for designing efficient transducers. We pose the design of the drive as an optimization problem, where the transduction efficiency is the quantity being maximized, and employ numerical optimization techniques to solve it. As far as we know, the time-dependence of the drive (or pump) provided to the quantum emitters being a result-effective variable for optimizing quantum transducer efficiency is not known in prior work.

A significant advantage of this approach is that it allows the design of drives that lead to an order of magnitude improvement in transduction efficiencies, when compared with drives that are constant in time.

The foremost commercial application of this work will be to the design of more efficient quantum emitter ensemble-based microwave-to-optical quantum transducers, which will meet the current technological need of realizing efficient quantum communication between distant superconducting quantum systems.

DETAILED DESCRIPTION

A) General Principles

Figure 1A:
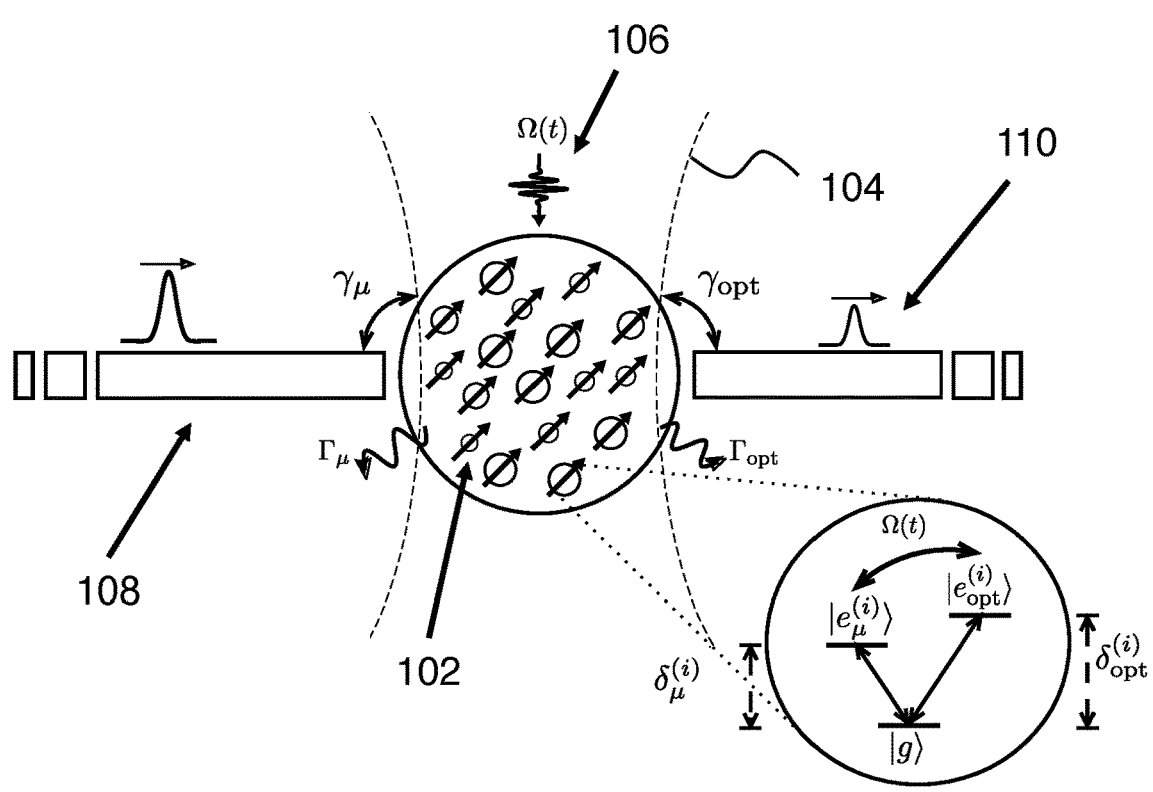
FIG. 1A show operation of an embodiment of the invention.

FIG. 1A shows operation of an exemplary embodiment of the invention. This example is a method of making a quantum transducer where the method includes:

i) preparing an ensemble of two or more quantum systems (e.g., 102), where resonance frequencies (e.g., $$\delta_\mu^{(i)}$$

and $$\delta_{opt}^{(i)})$$

of the two or more quantum systems differ according to an inhomogeneous broadening of the ensemble. Here the quantum systems are indexed by i, and it is possible for different quantum systems to have different resonant frequencies;

ii) pumping the ensemble with pump radiation (e.g., having a beam pattern as shown by 104), and having time dependence 106 (also referred to below as $\Omega(t)$) such that a resulting pumped ensemble coherently couples a first electromagnetic mode 108 to a second electromagnetic mode 110 to provide a coherent quantum transducer of the first and second electromagnetic modes; and iii) selecting a time dependence (i.e., $\Omega(t)$ on FIG. 1A) of the pump radiation according to a numerical maximization of steady state transduction efficiency having characteristics of the inhomogeneous broadening of the ensemble as an input. This is described in greater detail below.

The free space wavelength of the first electromagnetic mode can be in a range from 1 mm to 1 m (which can be regarded as "microwave" radiation), and the free space wavelength of the second electromagnetic mode can be in a range from 100 nm to 1 mm (which can be regarded as "optical" radiation).

The characteristics of the inhomogeneous broadening of the ensemble can include resonant frequencies of each of the quantum systems. Alternatively, the characteristics of the inhomogeneous broadening of the ensemble can include a probability density function of resonant frequencies of the quantum systems. Equivalently, the ensemble can be characterized by energy levels of each of the quantum systems and/or probability density functions of the energy levels.

Suitable quantum systems include but are not limited to: color centers and rare earth ion dopants.

Preferably, the numerical maximization of steady state transduction efficiency is performed in a time-dependent scattering theory framework by maximizing time integrated power in an output optical mode for a specified input microwave mode wave-packet by varying amplitudes and phases of frequency components of the pump radiation.

In cases where the two or more quantum systems are indexed by an integer i, each quantum system can include a V-configuration of three quantum states having distinct energies $$E_g^i, E_\mu^i, E_{opt}^i$$

for a first quantum state, a second quantum state and a third quantum state, respectively. Here $$E_g^i < E_\mu^i \text{ and } E_g^i < E_{opt}^i$$

for each quantum system i, and the pump radiation coherently couples the first quantum state to the second quantum state and coherently couples the first quantum state to the third quantum state for at least one of the quantum systems.

B) Detailed Example

B1) Introduction

Current superconducting quantum systems are able to achieve non-trivial quantum computational tasks and connecting them as nodes of a quantum internet can realize scalable, distributed quantum computing. Since superconducting quantum systems operate at microwave frequencies, there are technological restrictions to directly connecting distant systems. Commercial microwave cables are dominated by thermal noise at room temperature and hence cause huge loss over long distances. On the other hand, cryo-cooled superconducting transmission lines are low loss but limited to short distances. Optical photons are better 'flying' qubits; they can be transmitted with low loss over long distances through optical fibers. To connect superconducting quantum systems, there is a necessity to realize coherent transduction systems that can convert photons coherently and bi-directionally between microwave and optical frequencies.

Many approaches have been proposed to construct such transducers. Microwave-to-optical transducers couple fields oscillating at the respective frequencies through a non-linear medium that can be driven externally to bridge the gap between these frequency regimes. The different types of non-linear media that have been studied so far are, electro-optic materials, magnon modes, optomechanical systems, and broadly, ensembles of atomic systems.

Solid-state emitters (like color centers in diamond and silicon carbide and rare-earth ions doped in crystals) can have transitions coupling to both microwave and optical fields. They provide an attractive platform for implementing transducers owing to the possibility of integration with superconducting quantum systems and scalability afforded by rapidly developing nano-fabrication techniques. However, single defects are often only weakly coupled to the microwave and optical fields, leading to low transduction efficiencies. An approach to overcoming this limitation is to use ensembles of such emitters coupling to the same microwave and optical channels—the coupling strength is then enhanced proportionally to the number of emitters as a consequence of the formation of a collective superradiant state of the emitters.

In practical devices, emitters do not have identical resonant frequencies—this inhomogeneous broadening in the resonant frequencies prohibits the formation of a collective superradiant state and lowers the transduction efficiencies. However, the temporal shape of the lasers driving the emitter ensembles can be experimentally tuned—this opens up the possibility of using quantum control techniques to compensate for inhomogeneous broadening in the emitter ensemble, restore superradiance, and improve transduction efficiencies.

Quantum control techniques have traditionally been employed to control the state of quantum systems like ions, atoms, superconducting qubits, and solid-state emitters. Furthermore, several previous works have also applied quantum control techniques for addressing inhomogeneous ensembles for various quantum technology applications. However, most of these previous results consider an inhomogeneous non-interacting ensemble, in which case the system can be effectively analyzed with the density matrix of a single emitter obtained by averaging the individual inhomogeneous emitter trajectories. Several results related to controllability of such systems have been previously provided, together with analytical and numerical techniques to discover optimal controls. The problem of restoring superradiance in an inhomogeneous ensemble is distinct from the settings considered in these works in two key aspects—first, we must necessarily account for the collective interaction between the different emitters mediated by the optical and microwave fields by considering the state of the entire ensemble while designing the optimal control. Second, the model that we use is severely limited in terms of the control parameters available—we do not assume that each emitter is individually accessible as practical experimental setups can only easily apply a single control signal across all the emitters.

Our approach to solving this design problem is to use a time-dependent scattering theory framework to pose the problem of inhomogeneity compensation as a control problem—this framework not only allows us to account for the collective interaction between the emitters as mediated by the optical and microwave fields, but also account for properties of the emitted and absorbed photons in the resulting quantum control problem. For the emitter based transduction system, we solve the resulting control problem using a gradient-based optimization algorithm to demonstrate an order of magnitude improvement in the transduction efficiencies. Furthermore, to assess the optimality of the resulting solution, we calculate provable upper bounds on the transduction efficiencies achievable by designing the temporal shape of the laser drive.

B2) Results

Figure 1B:
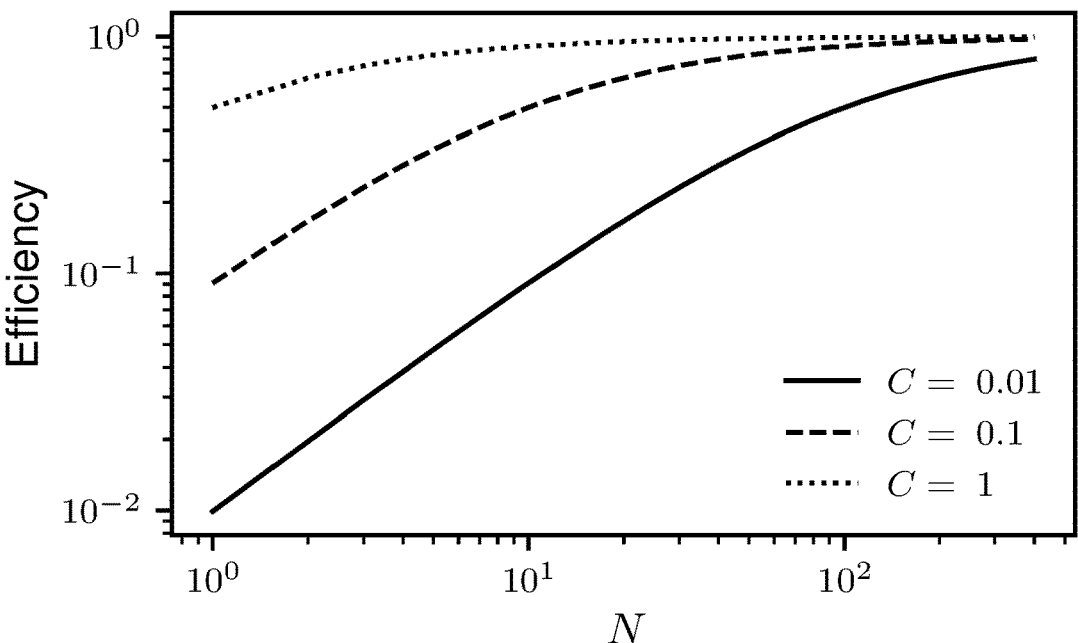
FIG. 1B shows the dependence of transducer efficiency on number of emitters N for the ideal case of no inhomogeneous broadening.
Figure 1C:
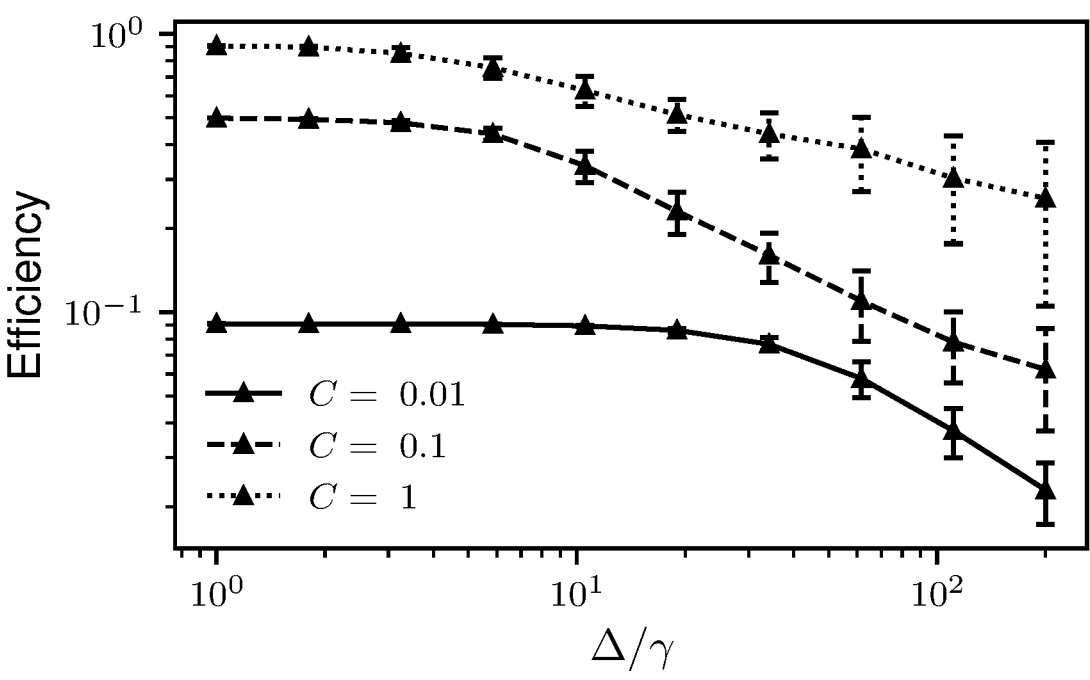
FIG. 1C shows efficiency vs. inhomogeneous broadening width $\Delta$ for various cooperativity values, with no optimization of the pump.
Figure 1D:
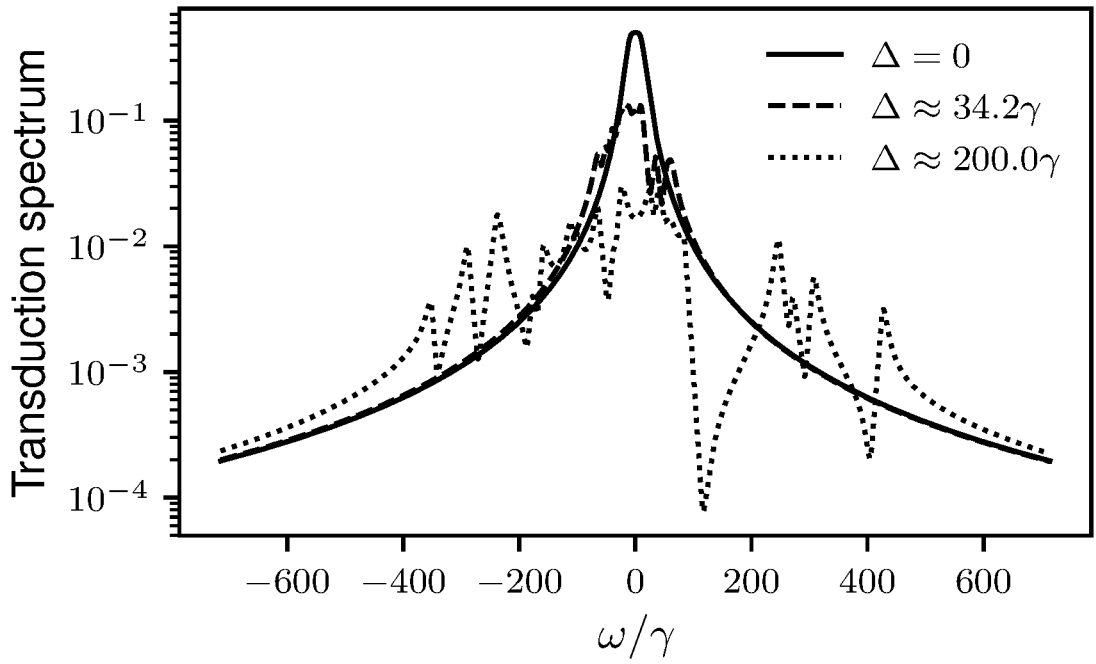
FIG. 1D shows transduction spectra of ensembles with varying $\Delta$.

FIG. 1A is a schematic of a three-level system ensemble-based transducer device. FIG. 1B shows scaling of transduction efficiency with increasing number (N) of three-level systems in a homogeneous ensemble for different cooperativities C (we keep $\gamma$ fixed and vary $\Gamma$ to vary cooperativity). FIG. 1C shows decrease in the transduction efficiency through randomly inhomogeneously broadened ensembles of N=10 emitters with increasing inhomogeneous broadening $\Delta$ for different cooperativities C. For each value of the inhomogeneous broadening $\Delta$, 100 randomly broadened ensembles are created by sampling the emitter detunings $$\delta_\mu^{(i)}, \delta_{opt}^{(i)}$$

from a Gaussian distribution with standard deviation equal to $\Delta$. Each plot point corresponds to the mean over the 100 ensembles with inhomogeneous broadening equal to the corresponding value of $\Delta$ and the error bars represent the standard deviation. FIG. 1D shows transduction spectra of ensembles (N=10, C=0.1) with varying inhomogeneous broadening $\Delta$.

The transducer model being considered in this article is schematically depicted in FIG. 1A. The emitter ensemble, with each emitter considered to be a three-level system, is coupled to microwave and optical modes with coupling operators $L_\mu$ and $L_{opt}$ respectively, where $$L_\mu = \sum_{i=1}^{N} \sqrt{\gamma_\mu}\, \sigma_\mu^i \text{ and } L_{opt} = \sum_{i=1}^{N} \sqrt{\gamma_{opt}}\, \sigma_{opt}^i \qquad (1)$$

Here, $\gamma_\mu$ and $\gamma_{opt}$ are the decay rates of the emitters into the microwave and optical modes respectively, N is the number of emitters in the ensemble, and $$\sigma_\mu^i \text{ and } \sigma_{opt}^i$$

are the lowering operators for transitions of the ith emitter in the ensemble. In addition to coupling to the optical and microwave modes, each emitter can also decay into additional loss channels, modeling unwanted radiative and non-radiative losses, with decay rates $\Gamma_\mu$ and $\Gamma_{opt}$ from the excited states $$|e_\mu^i\rangle \text{ and } |e_{opt}^i\rangle,$$

respectively. Furthermore, the transition between the two excited states is driven by a laser with envelope $\Omega(t)$.

For emitter ensembles formed out of identical emitters, the transduction efficiency is determined by the cooperativity of the individual transitions, $C_\mu = \gamma_\mu/\Gamma_\mu$ for microwave and $C_{opt} = \gamma_{opt}/\Gamma_{opt}$ for optical, as well as the number of emitters. We assume $\gamma_\mu = \gamma_{opt} = \gamma$, $\Gamma_\mu = \gamma_{opt} = \Gamma$, and $C_\mu = C_{opt} = C = \gamma/\Gamma$ in our simulations for simplicity of analysis.

FIG. 1B shows the transduction efficiency of this system as a function of the number of emitters for different emitter cooperativities—due to the formation of a collective super-radiant state between the different emitters, this efficiency asymptotically reaches 1 on increasing the number of emitters. Furthermore, the number of emitters needed to obtain high efficiency increases with a decrease in the cooperativity of the individual emitters. We point out that for high microwave and optical cooperativities, near unity transmissions can be obtained with a single emitter and consequently it is unnecessary to use emitter ensembles. We thus focus on low cooperativity emitters in the remainder of this article. On introducing inhomogeneous broadening into the emitter frequencies, the efficiency of the transduction system decreases (FIG. 1C)—for large inhomogeneous broadening, the emitters do not form a collective superradiant mode and the transduction spectrum simply includes the individual transduction spectra of the emitters in the ensemble (FIG. 1D).

Since the laser pulse $\Omega(t)$ couples the microwave and optical transitions, we expect that unwanted variations in the transition frequencies can be compensated for by modulating the temporal form of this laser. However, in practical transduction systems, it is difficult to address individual emitters with separate lasers and consequently any modulation of $\Omega(t)$ impacts all the emitters. This makes designing the laser pulses difficult and calls for an application of numerical optimization techniques. We thus pose its design as maximizing the total power obtained in the optical mode when the emitter ensemble is excited with a single photon in the microwave mode:

$$\max_{\Omega(t)} \int_{-\infty}^{\infty} dt\, |a_{opt}(t)|^2 \qquad (2a)$$

subject to $$i\frac{d|\psi_e(t)\rangle}{dt} = H_{eff}(\Omega(t))|\psi_e(t)\rangle + a_\mu(t)L_\mu^\dagger|G\rangle \qquad (2b)$$

$$a_{opt}(t) = -i\langle G|L_{opt}|\psi_e(t)\rangle$$

where the time-domain wave-packets of the single microwave input photon and optical output photon are described by $a_\mu(t)$ and $a_{opt}(t)$ respectively, $|\psi_e(t)\rangle$ is the state of the emitters in the ensemble, $|G\rangle$ is the ground state of the ensemble, and $H_{eff}(\Omega)$ is the non-Hermitian effective Hamiltonian of the system when all the emitters are uniformly driven by a laser with amplitude $\Omega$. We point out that the constraints are simply the input-output equations describing the dynamics of the transduction process under excitation with a single photon. Furthermore, since experimentally realizable laser pulses will be band-limited, we parametrize $\Omega(t)$ as a finite sum of harmonics, $$\Omega(t) = \sum_{n=0}^{N_h} \Omega_n \cos(n\omega_0 t + \phi_n) \qquad (3)$$

consequently constraining its bandwidth to be $N_h\omega_0$.

The design problem of Eq. 2a-b can be solved using off-the-shelf gradient-based local optimizers. The gradient of the objective function in this problem with respect to the parameters $\Omega_n$, $\phi_n$ can be computed using the time-domain adjoint variable method.

Figures 2A, 2B, 2C:
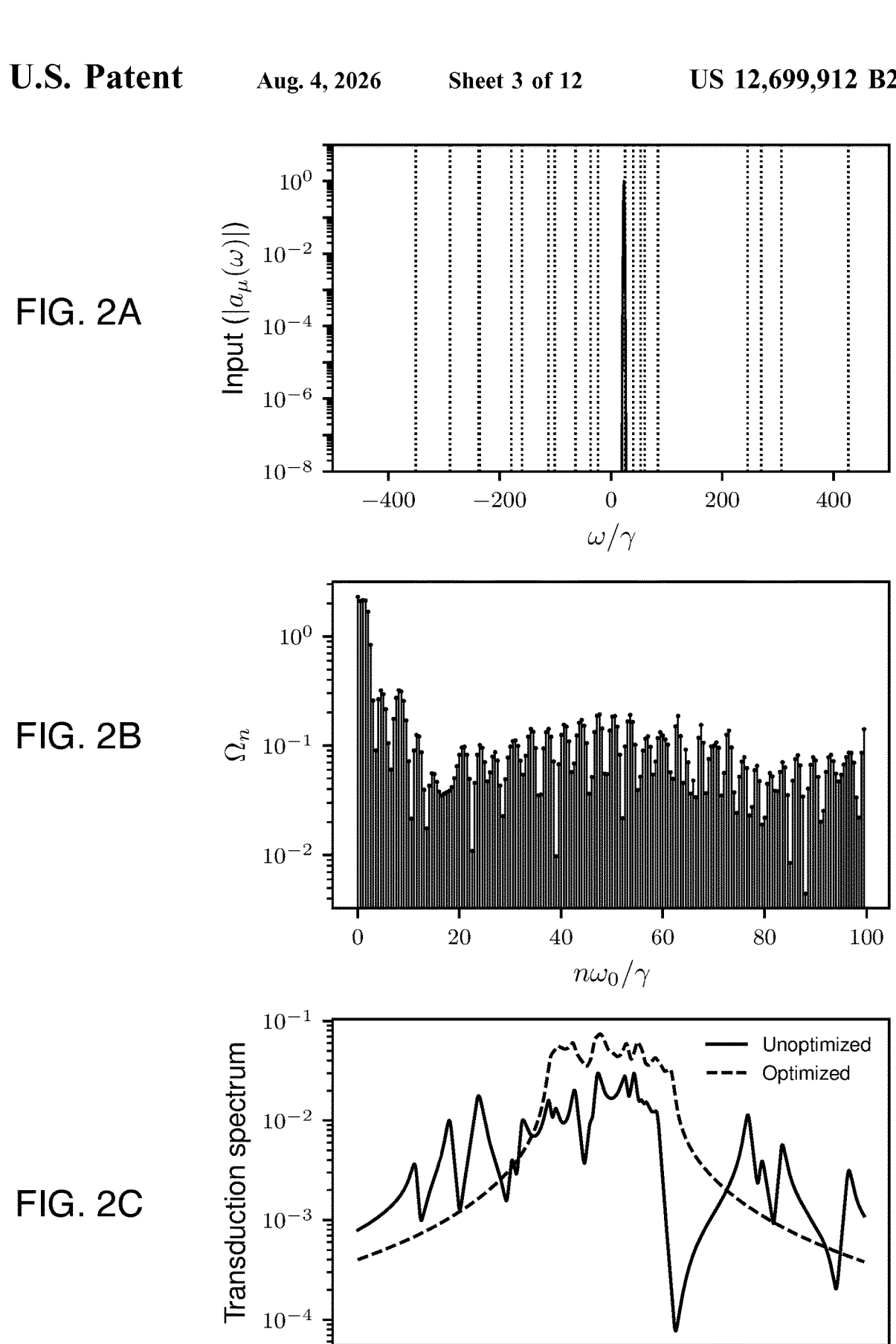
FIG. 2A shows a Fourier transform of the input microwave field.
FIG. 2B shows amplitudes of an optimized $\Omega(t)$.
FIG. 2C compares the transduction spectrum with and without optimization of $\Omega(t)$.

FIG. 2A shows the Fourier transform of the input microwave field (Gaussian waveform). Dashed lines are representative of the individual emitter frequencies in a random ensemble (N=10, $\Delta$=200$\gamma$). FIG. 2B shows amplitudes of the harmonic components of the optimized $\Omega(t)$ designed for the same ensemble. FIG. 2C is a comparison of the transduction spectrum of the same ensemble with and without optimized drives applied—the transduction spectrum with the optimized drive is computed using a Floquet scattering theory approach.

As an example, we consider a transduction system with N=10 inhomogeneous emitters excited with a single microwave photon with a Gaussian spectrum. FIG. 2A shows the spectrum of the input photon, with the dashed lines depicting the resonant frequencies of the transduction spectra of the individual emitters. Given its narrow bandwidth, we expect the input photon to effectively only interact with a single emitter, leading to a low transduction efficiency comparable to what can be achieved by using just one emitter instead of many. The optimized drive obtained on solving problem (Eq. 2a-b) is depicted in FIG. 2B—as can be seen from FIG. 2C, the transduction spectrum in the presence of the optimized drive shows improvement relative to the one with constant (unoptimized) drive.

Figure 3A:
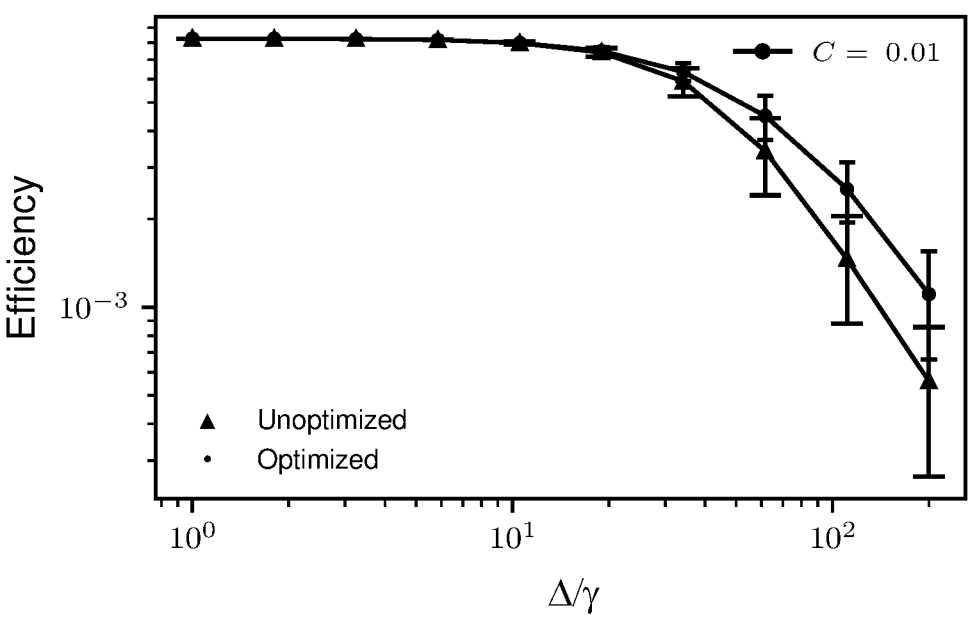
FIGS. 3A-B show countering of inhomogeneous broadening with optimized drive for C=0.01.
Figure 3B:
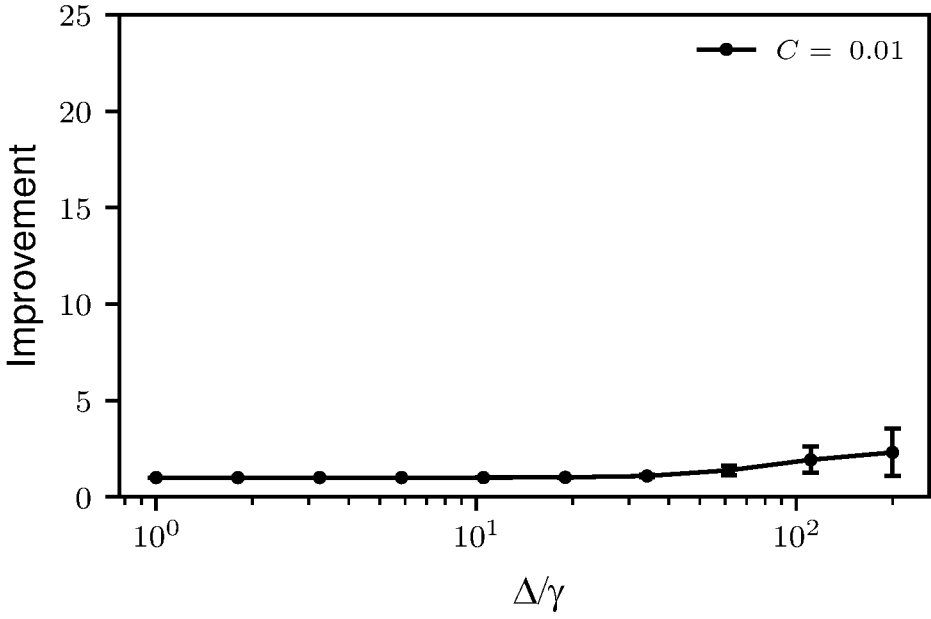
Figure 3C:
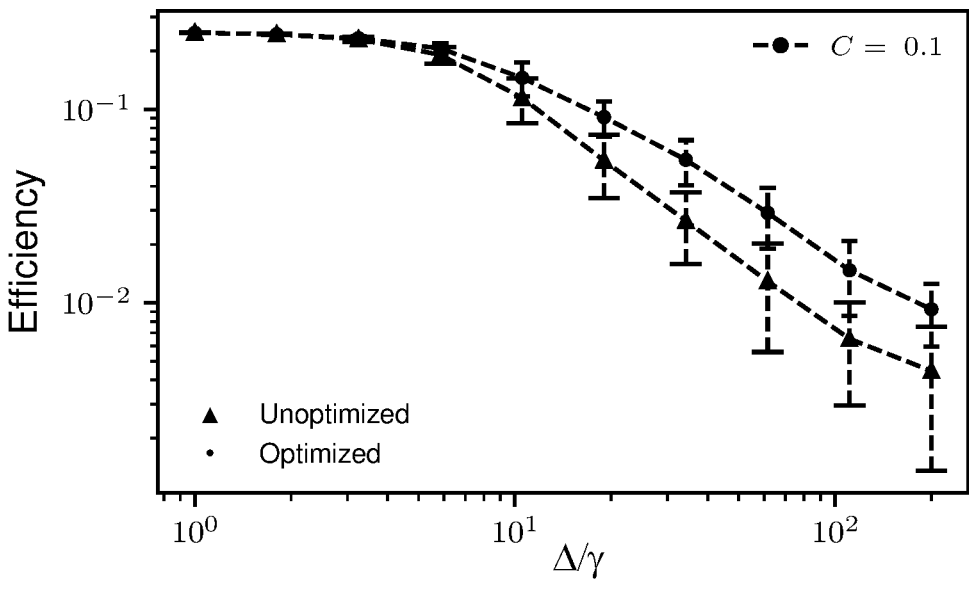
FIGS. 3C-D show countering of inhomogeneous broadening with optimized drive for C=0.1.
Figure 3D:
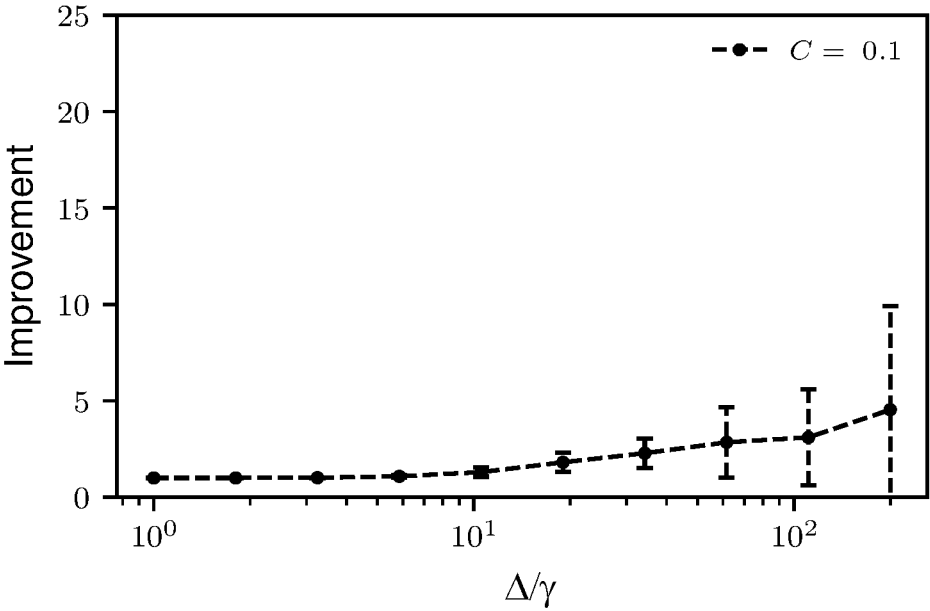
Figure 3E:
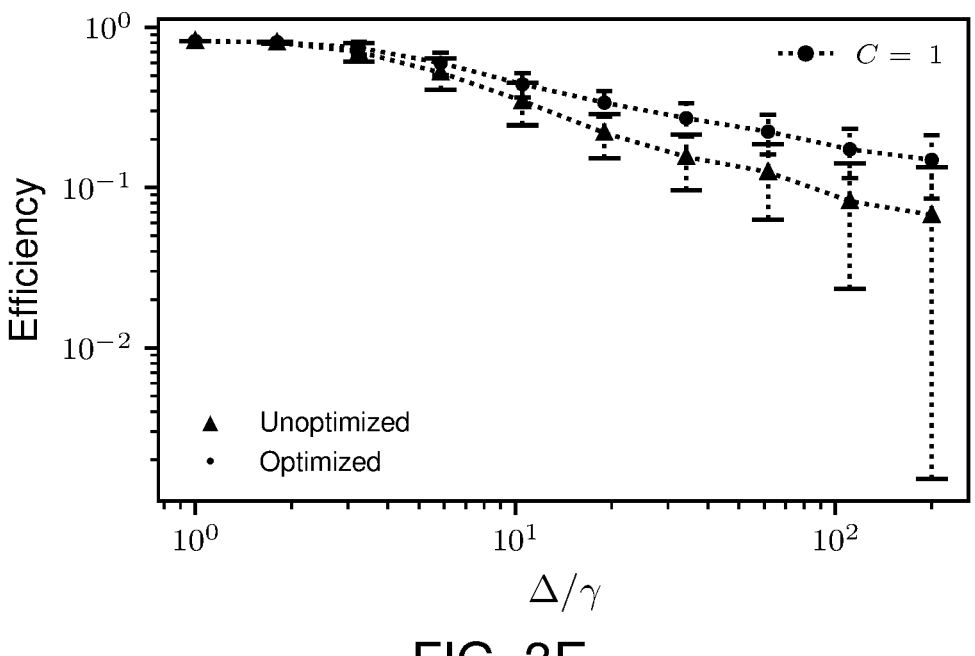
FIGS. 3E-F show countering of inhomogeneous broadening with optimized drive for C=1.
Figure 3F:
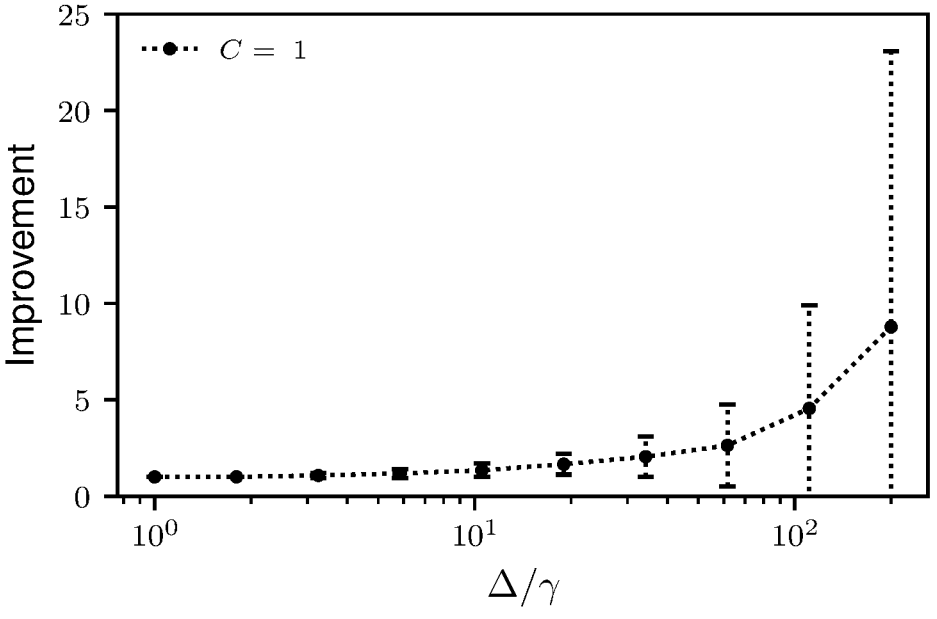

FIGS. 3A-F show optimized drives countering inhomogeneous broadening. FIGS. 3A, C, E show transduction efficiency and FIGS. 3B, 3D, 3F show improvement in the transduction efficiency for C=0.01, 0.1, 1, respectively. Here we consider randomly inhomogeneously broadened ensembles of N=10 emitters with increasing inhomogeneous broadening for different cooperativities C when the optimized drives are applied. For each $\Delta$, optimized drives are designed for each of the same 100 randomly generated ensembles with inhomogeneous broadening equal to $\Delta$ as used in FIG. 1C. Before running the optimizations, for each ensemble, the input photon is frequency-shifted to match the highest peak of the unoptimized transduction spectrum. Also, the initial condition for the optimization is $\Omega(t)$=(N$\gamma$+$\Gamma$)/2, which is a constant drive that maximizes the transduction efficiency through a homogeneous ensemble with the same decay rates. Improvement is defined as the ratio of the efficiencies with and without the optimized drive applied. Each plot point corresponds to the mean over the 100 ensembles with inhomogeneous broadening equal to the corresponding value of $\Delta$ and the error bars represent the standard deviation.}

Statistical studies of performance of the optimization procedure for different sets of emitter frequencies is shown in FIGS. 3A-F—FIGS. 3A, 3C, 3E shows the optimized transduction efficiencies and FIGS. 3B, 3D, 3F shows the improvement in the transduction efficiencies. We observe that the improvements are larger at higher inhomogeneous broadening. Furthermore, the cooperativities of the emitters set a limit on improvement that can be obtained by shaping the laser pulse—as can be seen from FIGS. 3B, 3D, 3F, the improvements are generally smaller for lower cooperativities.

Figure 4A:
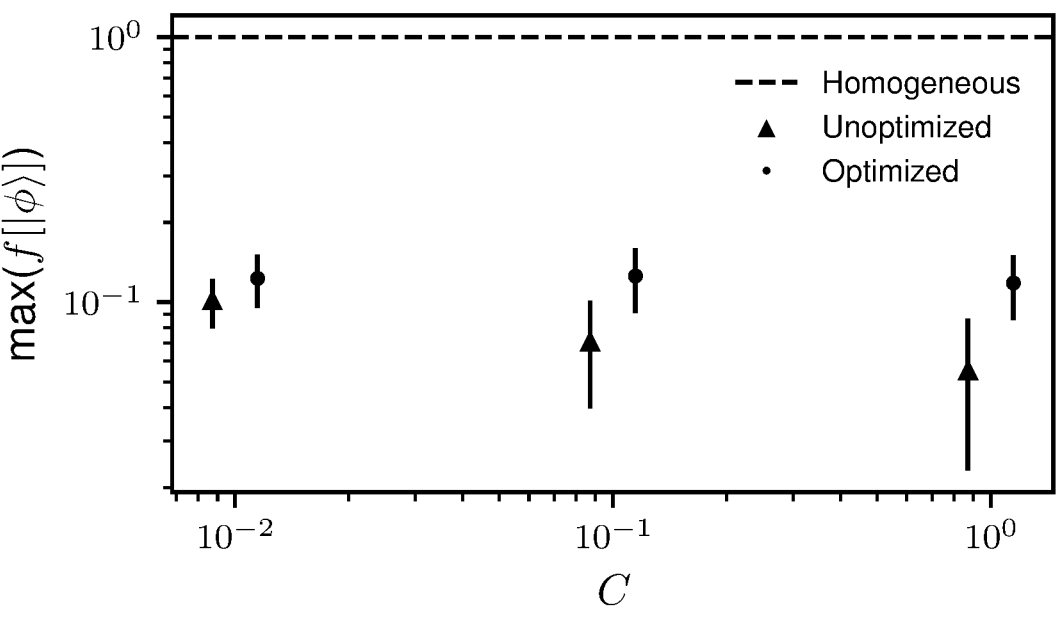
FIG. 4A show the superradiance metric for several cases with and without optimized drive.
Figure 4B:
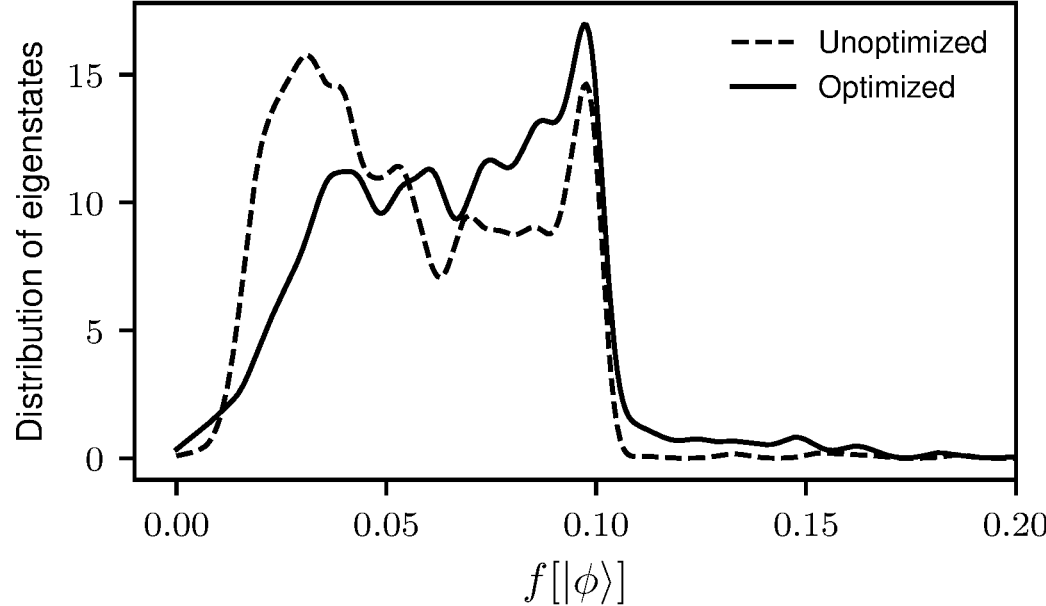
FIGS. 4B-D are density plots of the superradiance measure for several different cooperativity values.
Figure 4C:
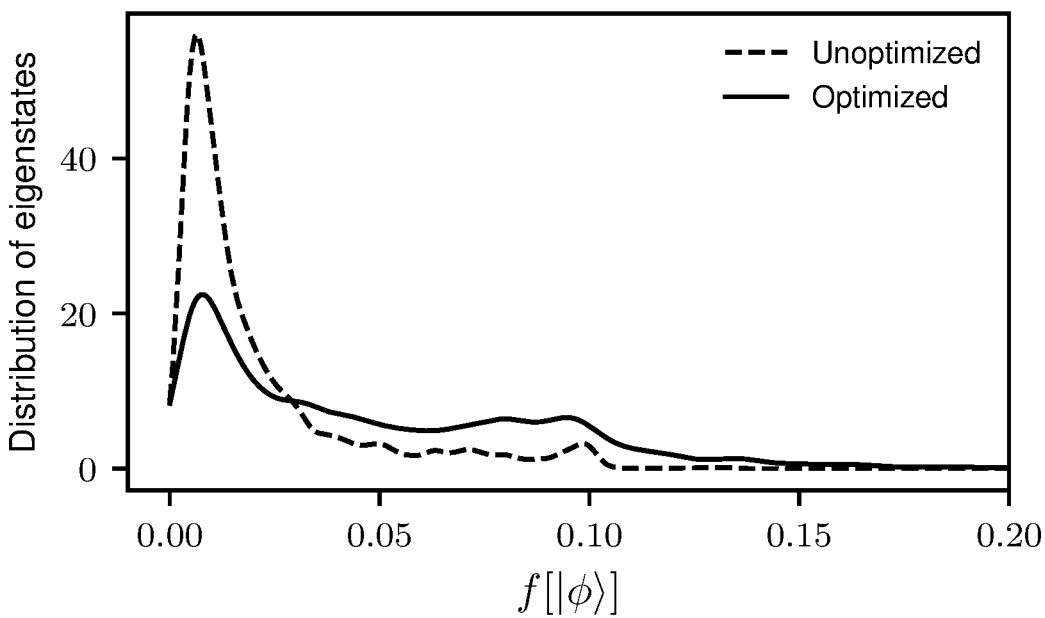
Figure 4D:
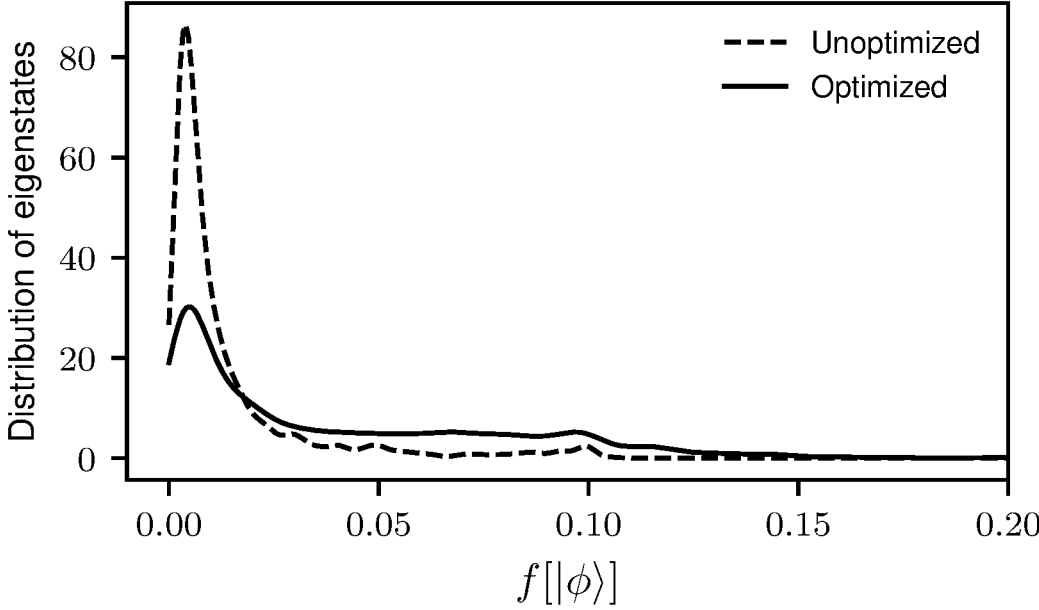

FIG. 4A is a comparison of the superradiance metric for ensembles with inhomogeneous broadening $\Delta$=200$\gamma$ with and without optimized drives applied (data for optimized and unoptimized cases are dodged in the plot for visual clarity). After generating the optimized drives used in FIGS. 3A-F, we compute the metric for all eigenstates of each of the 100 random ensembles with inhomogeneous broadening $\Delta$=200$\gamma$ by numerically diagonalising the propagator over one time period of the effective Hamiltonian. Each plot point and associated error bars correspond to the mean and standard deviation (over the collection of ensembles with $\Delta$=200$\gamma$) of the maximum value of the superradiance measure f[|$\phi$)] over all Floquet eigenstates |$\phi$). The dashed line denotes the same for a homogeneous ensemble. As we increase $\Gamma$ to decrease the cooperativity, the metric is larger on average in the unoptimized case. We attribute this to the simultaneous increase in the unoptimized drive $\Omega(t)$=(N$\gamma$+$\Gamma$)/2 overshadowing the constant inhomogeneous broadening $\Delta$=200$\gamma$. FIGS. 4B, 4C, 4D are density plots (obtained by kernel density estimation using Gaussian kernels) of the superradiance measure for eigenstates of the 100 ensembles with inhomogeneous broadening $\Delta$=200$\gamma$, (FIG. 4B) C=0.01, (FIG. 4C) C=0.1, (FIG. 4D) C=1.

While it is intuitively expected that improvement in transduction efficiency with the application of an optimized drive is due to recovery of superradiance, this can be made more concrete by studying the Floquet eigenstates of the optimized (time-dependent) effective Hamiltonian. The 'superradiance' in an eigenstate |$\phi$) of the propagator over one time period of the effective Hamiltonian, can be quantified with the metric, $$f[|\phi\rangle] = \frac{2}{N\sqrt{\gamma_\mu \gamma_{opt}}} |\langle G|L_{opt}|\phi\rangle\langle\phi|L_\mu^\dagger|G\rangle| \qquad (4)$$

For a homogeneous ensemble, the metric is 1 for two eigenstates formed by the drive-induced hybridization of superradiant states corresponding to the microwave and optical transitions. Furthermore, it is 0 for the remaining eigenstates since they are subradiant/dark. Since the eigenstates for an inhomogeneous ensembles are not perfectly superradiant or subradiant, their corresponding metric lies between 0 and 1 and quantifies the extent of their subradiant or superradiant character. FIG. 4A indicates that an application of the optimized drive statistically increases the value of this metric, indicating partial recovery of superradiance. The density plots in FIGS. 4B-D show the distribution of the superradiance metric of the eigenstates of an inhomogeneously broadened ensemble.

Figure 5A:
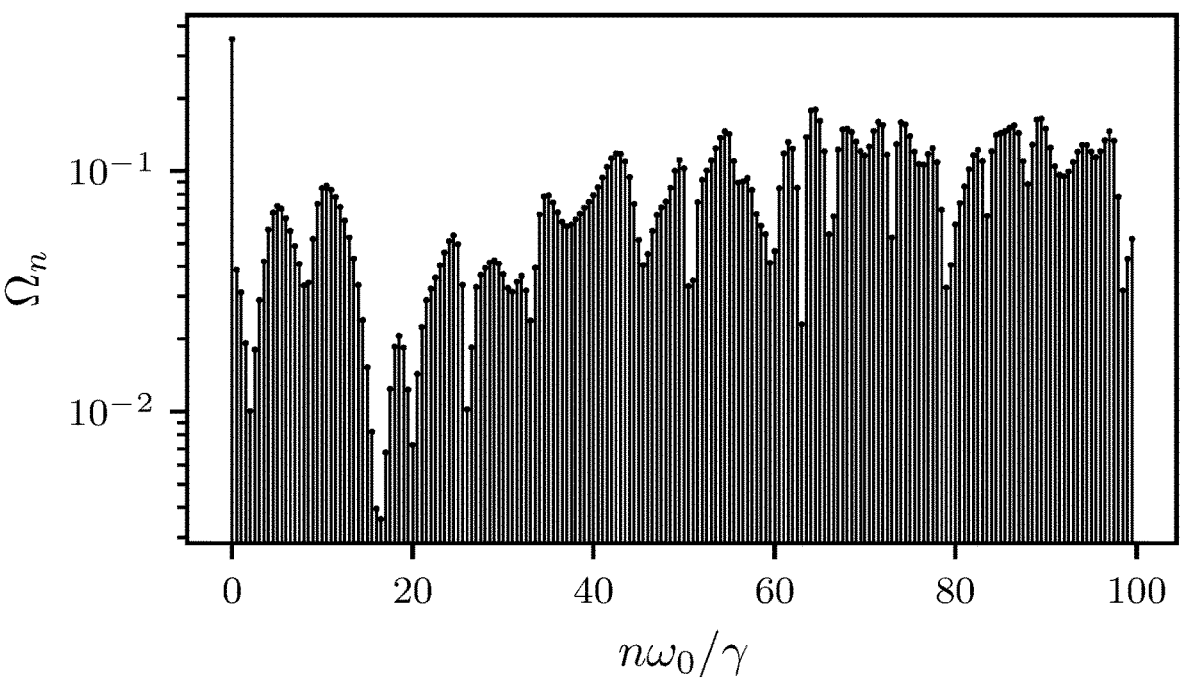
FIG. 5A shows an example of frequency components of an unoptimized drive.
Figure 5B:
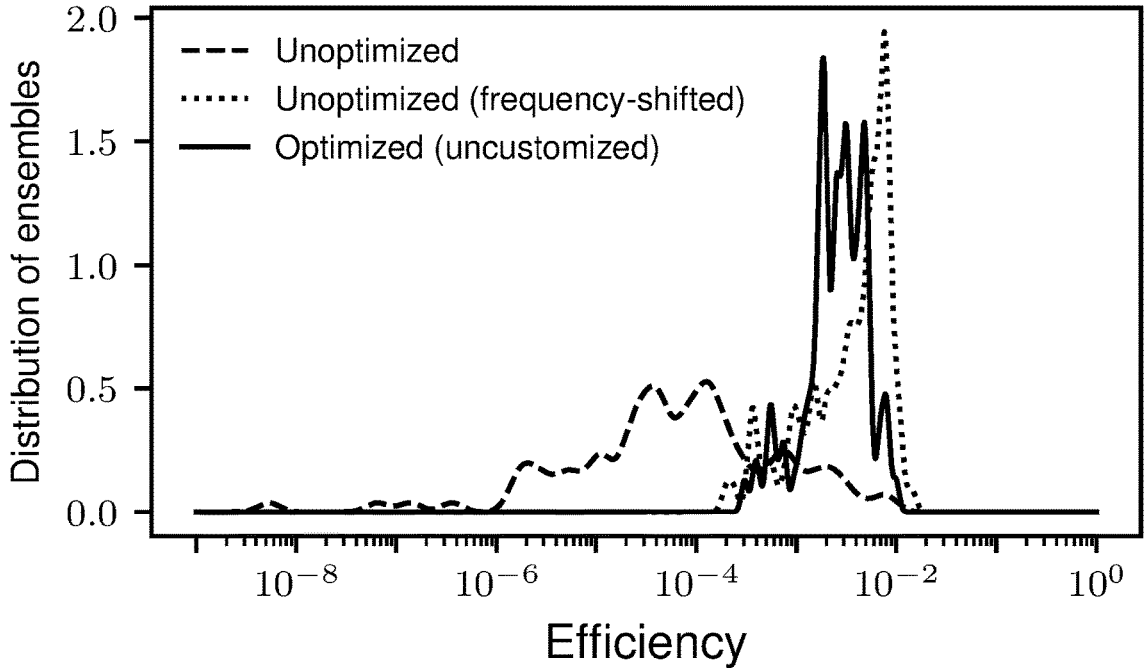
FIG. 5B is a density plot of transduction efficiency for various drive conditions.

FIGS. 5A-B show transduction efficiency improvement with uncustomized optimization. FIG. 5A shows amplitudes of the frequency components in the uncustomized drive. FIG. 5B show density plots of the transduction efficiency through 100 ensembles (test set) with $\Delta$=200$\gamma$, C=0.1 for three cases—(dashed line) no optimized drive is applied and the input photon is fixed at the resonance of a homogeneous ensemble, (dotted line) no optimized drive is applied but the input photon is frequency-shifted to match the highest peak of the unoptimized transduction spectrum for each inhomogeneous ensemble, and (solid line) the uncustomized optimized drive is applied and the input photon is fixed at the resonance of a homogeneous ensemble.

The results discussed above indicate that pulse-shaping the laser can be used to improve the performance of transduction systems. However, the optimized laser pulses can only be computed if the emitter frequencies are known. For systems with large number of emitters, such characterization might not be practical at scale and it would be desirable to find an optimized pulse which is robust to the specific frequencies of the emitters and depends only on their distribution. To design such a laser pulse, we modify the optimization problem (Eq. 2a-b) to $$\max_{\Omega(t)} \frac{1}{N_s} \sum_{n=1}^{N_s} \int_{-\infty}^{\infty} dt |a_{opt}^{(n)}(t)|^2 \qquad (5a)$$

such that $$i\frac{d|\psi_e^{(n)}(t)\rangle}{dt} = H_{eff}^{(n)}(\Omega(t))|\psi_e^{(n)}(t)\rangle + a_\mu(t)L_\mu^\dagger|G\rangle \qquad (5b)$$

$$a_{opt}^{(n)}(t) = -i\langle G|L_{opt}|\psi_e^{(n)}(t)\rangle$$

where we generate $N_s$ inhomogeneous emitter samples from the same inhomogeneous broadening distribution and find a laser pulse $\Omega(t)$ that optimizes the average transduced power over all the samples. The superscript over a quantity in problem (5a-b) indicates that that quantity is computed for a specific sample. We design such a drive, shown in FIG. 5A, for a training set of $N_s=100$ random ensembles with inhomogeneous broadening $\Delta=200\gamma$ and with the input-photon being incident at the resonance of a homogeneous ensemble.

FIG. 5B shows the resulting improvement in transduction efficiency from applying the optimized drive to a test set of 100 random ensembles that are generated from the same inhomogeneous broadening distribution, independently of the training set. While there is significant improvement over the unoptimized case, we point out that simply shifting the spectrum of the input photon without shaping the driving laser pulse results in similar improvements. Therefore, it is not expected that this optimized drive is restoring superradiance in the emitter ensemble, rather it is effectively matching the resonance of the transduction spectrum to the input photon in a manner robust to the specific emitter frequencies. This could still be technologically useful since this optimized drive is agnostic to the specific emitter frequencies, thus obviating the need to characterize the emitter resonances. Furthermore, if many transducers are to be operated simultaneously, experimentally realizing and supplying drives customized to each transducer can be challenging to scale—having a common, uncustomized drive would solve this problem.

Figure 6A:
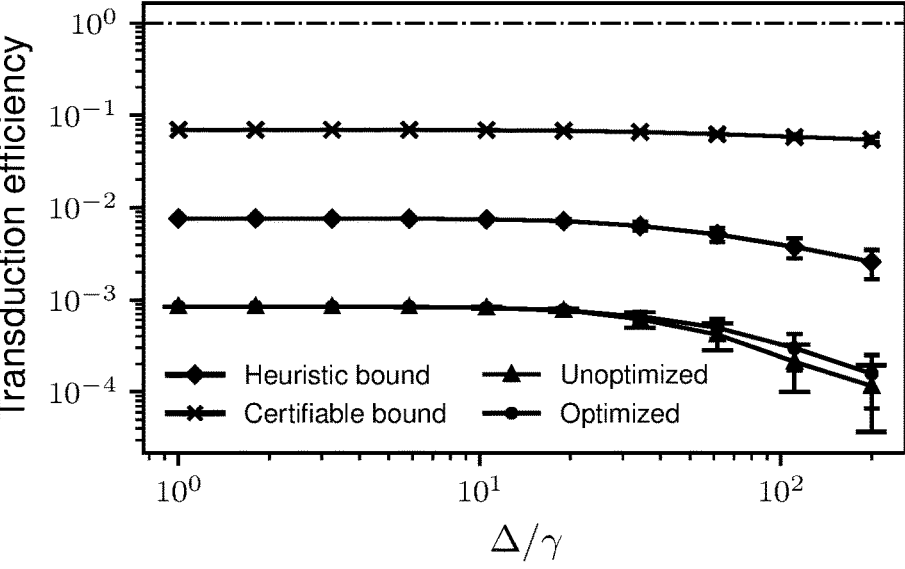
FIGS. 6A-C show efficiency results and corresponding bounds vs. $\Delta$ for several different cooperativity values.
Figure 6B:
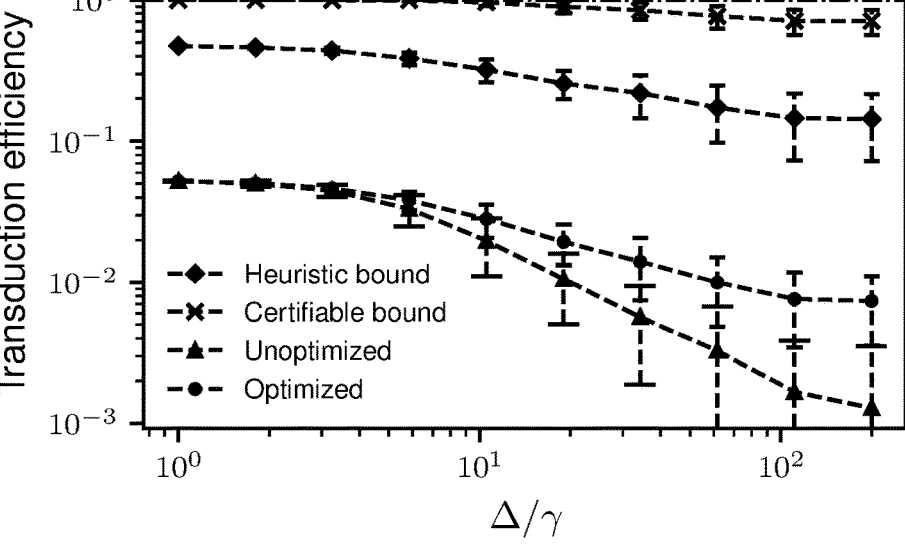
Figure 6C:
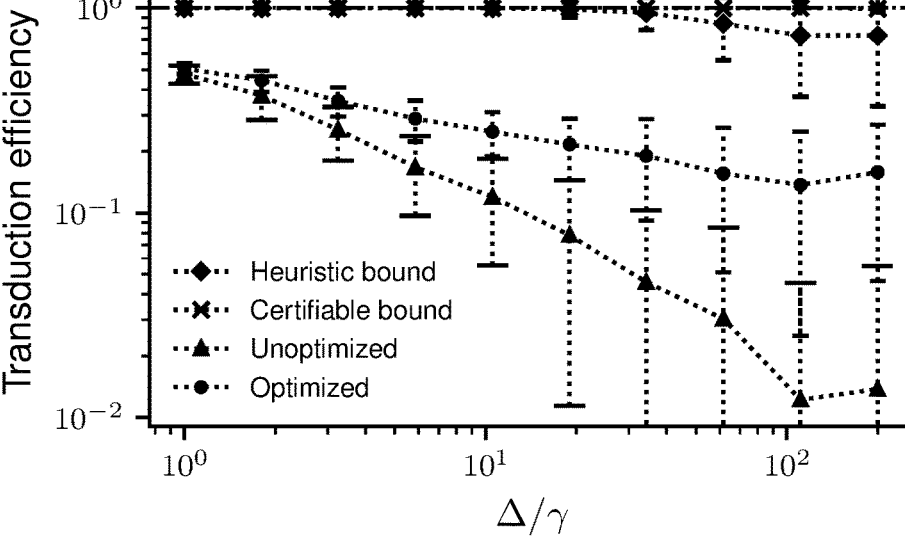

FIGS. 6A-C show heuristic and certifiable upper bounds and unoptimized and optimized transduction efficiencies calculated for ensembles with N=3 emitters and cooperativities (FIG. 6A) C=0.01, (FIG. 6B) C=0.1, (FIG. 6C) C=1. For each $\Delta$, 100 random ensembles are generated with inhomogeneous broadening equal to $\Delta$. For each such ensemble, optimized drives are designed to improve transduction efficiency by using a local optimizer to solve problem (2a-b). Then, using the state obtained by solving the input-output equation with the aforementioned optimized drive as the reference state, heuristic and certifiable bounds are calculated. Each plot point corresponds to the mean over the 100 ensembles with inhomogeneous broadening equal to the corresponding value of $\Delta$ and the error bars represent the standard deviation.

Finally, we address the question about the optimality of the laser pulses calculated using the gradient-based optimization algorithm. Since the optimization problem (2a-b) is non-convex, we can only solve it locally and calculating the solution globally will likely be hard. However, one method to assess how close the laser pulses obtained above are to the globally optimal solution is to calculate upper bounds on the achievable transduction efficiency and compare it to the locally optimized results.

The physically motivated idea behind calculating such an upper bound is to note that the efficiency is limited by the amplitude of the emitters in their excited state while interacting with the input photon, as well as the time that the emitters spend in the excited state. More rigorously, in the presence of the incident single-photon wave-packet as well as a decay of the excited state, the time-integrated norm of the excited state amplitude $|\psi_e(t)\rangle$ cannot be arbitrarily high. Consequently, an upper bound on the transduction efficiency can be obtained by simply maximizing the emitted photon energy as only constrained by this norm, which translates to solving the following optimization problem $$\max_{\Omega(t)} \int_{-\infty}^{\infty} dt |a_{opt}(t)|^2 \qquad (6a)$$

subject to $$\int_{-\infty}^{\infty} |||\psi_e(t)\rangle - |\psi_{e,0}(t)\rangle||_2^2 dt < \varepsilon \qquad (6b)$$

$$a_{opt}(t) = -i\langle G|L_{opt}|\psi_e(t)\rangle$$

where $|\psi_{e,0}(t)\rangle$ is a reference state, $\| \ \|_2$ denotes the $l_2$ norm, and $\varepsilon$ is a parameter that can be considered as the solution of the following optimization problem:

$$\max_{\Omega(t)} \int_{-\infty}^{\infty} \left|\left| \ |\psi_e(t)\rangle - |\psi_{e,0}(t)\rangle \right|\right|_2^2 dt \qquad (7a)$$

subject to $$i\frac{d|\psi_e(t)\rangle}{dt} = H_{eff}(\Omega(t))|\psi_e(t)\rangle + a_\mu(t)L_\mu^\dagger|G\rangle \qquad (7b)$$

We point out that since by construction $\varepsilon$ provides an upper bound on the integrated norm of the difference of the excited state from the reference state for all allowed laser pulses, the optimization problem 6a-b is a relaxation of the original non-convex optimization problem (problem 2a-b). Therefore, the solution of problem 6a-b provides an upper bound to the (global) solution of problem 2a-b.

Problem (6a-b) is a quadratically-constrained quadratic program and bounds on its optimal value can be calculated by using the principle of Lagrangian duality. However, computing $\varepsilon$, which is required to solve problem 6a-b, again requires solving a non-convex problem (problem 7a-b). In order to get around this issue, we construct a provable upper bound, $\varepsilon_c$ on $\varepsilon$ which can also be used together with problem 6a-b to obtain an upper bound on the transduction efficiency. We point out that this bound will be looser than the one obtained on using ε, i.e., the tighter the bound on the norm of the excited state, the better the bound on the transduction efficiency.

FIG. 6 shows numerical studies of the upper bounds calculated on the transduction efficiency together with its comparison with the locally optimized results. In our numerical studies, we solve problem 6a-b to compute both a certifiable bound, which uses the upper bound $\varepsilon_c$ on ε, and a heuristic bound calculated with only locally optimal solutions of problem 7a-b. We observe that, as physically expected, the bounds decrease on average with increasing inhomogeneous broadening and are higher for higher cooperativities. Furthermore, the optimized transduction efficiencies are within an order of magnitude of the bound, which provides us with an estimate of the performance of the optimization method used in this work.

B3) Discussion

In this work, we have used gradient-based inverse design of the temporal shape of the driving field as a technique to compensate for the effects of inhomogeneous broadening to help realize more efficient transducers. We demonstrated that optimized driving fields can lead to improvement in transduction efficiencies and showed that this improvement can be correlated with restoration of superradiant effects. Finally, to characterize the limits of the performance of time-dependent drives obtained by optimization-based design, we calculated upper bounds on optimal transduction efficiencies.

Our design method is applicable to different physical platforms including color centers or rare-earth ions in solid-state hosts. The techniques used in this article can be extended to ensembles that are orders of magnitude larger by frequency-binning the randomly distributed transition frequencies. We will explore this direction in future work. In some physical systems the transition frequencies of the emitters can be modulated (for e.g., via Stark effect in $V_{Si}$ centers in SiC). Previous research has shown that direct modulation of the transition frequencies can also be used to compensate for inhomogeneous broadening in a cavity-QED setting. We anticipate that optimization-based design for transducers can also be applied with the direct modulation as the degree of freedom instead of the driving field.

Regarding experimental implementation of our design method, pulse shaping of the laser drive should be achievable by using a commercial electro-optic intensity modulator—we assume in our simulations that the highest harmonic component in the drive has a frequency of 1 GHz ($\gamma$=10 MHz). The experimental feasibility of designing photon emission and scattering properties by time-modulating solid-state emitters has been demonstrated before, albeit with modulation methods different from a laser drive.

B4) Methods

We discretize the input-output equations (the constraints in problem (2a-b) in time and simulate the dynamics to calculate the transduction efficiency using finite-difference methods. For the customized case, i.e., when the drive is designed for a specific ensemble, we use the L-BFGS-B (Limited memory-Broyden-Fletcher-Goldfarb-Shanno-Boxed) optimization algorithm. We employ a public domain stochastic optimization algorithm to design the uncustomized driving field.

B5) Supplement 1—Design of Optimized Drives with Overlap-Based Objectives

Quantum information can be encoded in the temporal modes of photons for the purposes of quantum communication. Such encoding would necessitate a transduction process that preserves the fidelity of the transduced photon's wave-packet to specific temporal modes. We demonstrate in this section that it is possible to extend our design method to compensate for inhomogeneous broadening and produce improvements in transduction efficiency while preserving the overlap with a specified temporal mode.

Figure 7A:
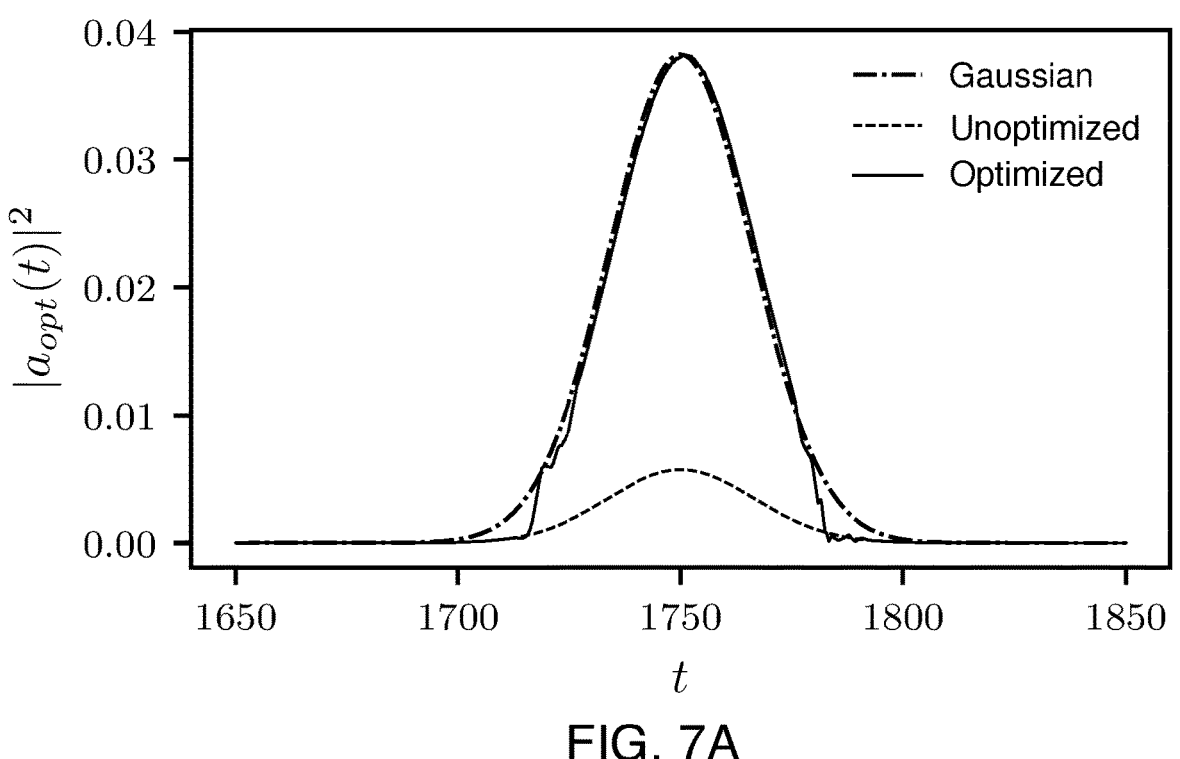
FIGS. 7A-B show temporal mode overlap-based design of optimized drives.
Figure 7B:
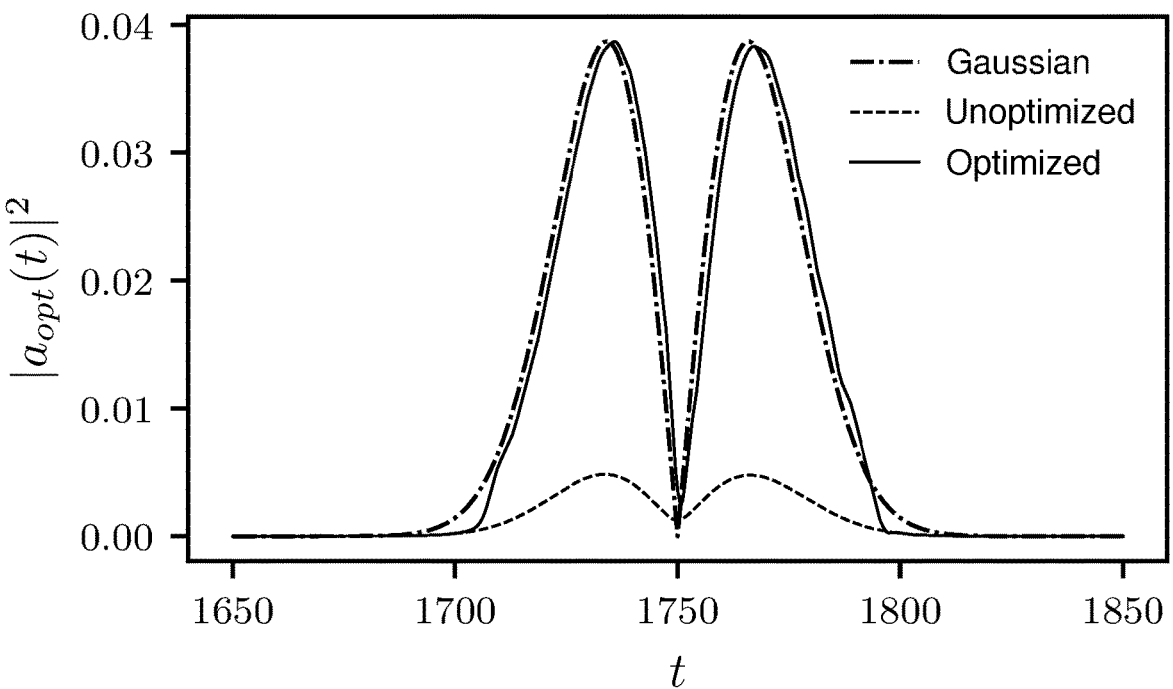

To achieve this, we pose the design of the drive as maximizing the overlap of the output photon's temporal wave-packet with a specified Hermite-Gaussian function. For example, $$\max_{\Omega(t)} \left| \int_{-\infty}^{\infty} dt \varphi_n(t) a_{opt}(t) \right|^2 \tag{8a}$$

subject to $$i\frac{d\,|\psi_e(t)\rangle}{dt} = H_{eff}(\Omega(t))\,|\psi_e(t)\rangle + a_\mu(t)L_\mu^\dagger\,|\,G\rangle \tag{8b}$$

$$a_{opt}(t) = -i\langle G|L_{opt}|\psi_e(t)\rangle$$

where $\varphi_n(t)$ is the nth-order Hermite-Gaussian function (normalized to unity)—if the input microwave photon occupies the nth-order Hermite-Gaussian mode, i.e. $a_\mu(t)=\varphi_n(t)$, we solve Eq. 8a-b to design a drive such that the output optical photon's power is concentrated in the nth-order mode too. We solve problem (8a-b) for a randomly generated inhomogeneous ensemble with N=10 emitters and input microwave photons occupying the 0th- and 1st-order Hermite Gaussian modes (n=0, 1). FIGS. 7A-B show that we observe improved transduction efficiencies into the desired output target mode in both cases. Furthermore, the ratio of the power in the desired output target mode to the total transduced output power is close to 99% in both cases.

FIGS. 7A-B show temporal mode overlap-based design of drives. The amplitude $|a_{opt}(t)|^2$ of the output photon's temporal wave-packet after transduction by an ensemble of emitters with N=10, C=0.1, $\Delta\approx$61.61$\gamma$, and under the application of drives obtained by locally solving problem (8a-b) is shown on FIG. 7A for n=0, $a_\mu(t)=\varphi_0(t)$ and is shown on FIG. 7B for n=1, $a_\mu(t)=\varphi_1(t)$. The curves labelled 'Gaussian' represent the (amplitude of the) Hermite-Gaussian modes $\varphi_0(t)$, $\varphi_1(t)$, respectively. The improvement in the transduced output power in the desired target modes are (FIG. 7A) ~61.05× and (FIG. 7B) ~62.43×. The ratio of the output power in the target mode to the total output power are (FIG. 7A) ~99% and (FIG. 7B) ~98.6%. The input photon's central frequency is fixed at the resonance of a homogeneous ensemble for both cases.

B6) Supplement 2—Effect of Noise in Optimized Drives

Experimental realizations (through laser pulse shaping) of the optimized drives generated by our design procedure will be subject to random noise in the form of intensity fluctuations. In this section, we analyze the effect of noise on the performance of optimized drives. For a time-dependent optimized drive $\Omega(t)$, we consider multiplicative noise of the following form, $$\Omega_{noisy}(t) = \Omega(t)(1 + E_t / 100) \qquad (9)$$

where $E_t$ are independent and identically distributed random variables with the following (uniform) probability densities parametrized by a variable e, $$p_{E_t}(x) = \begin{cases} 1/2e & \text{if } x \in [-e, e] \\ 0 & \text{otherwise} \end{cases} \qquad (10)$$

We apply the noise described above to customized optimized drives designed for 100 randomly inhomogeneously broadened ensembles of size N=10 and $\Delta=200\gamma$. FIG. 8 shows that even as the noise percentage parameter e is increased up to 50, the performance of the optimized drive decreases only slightly.

Figure 8A:
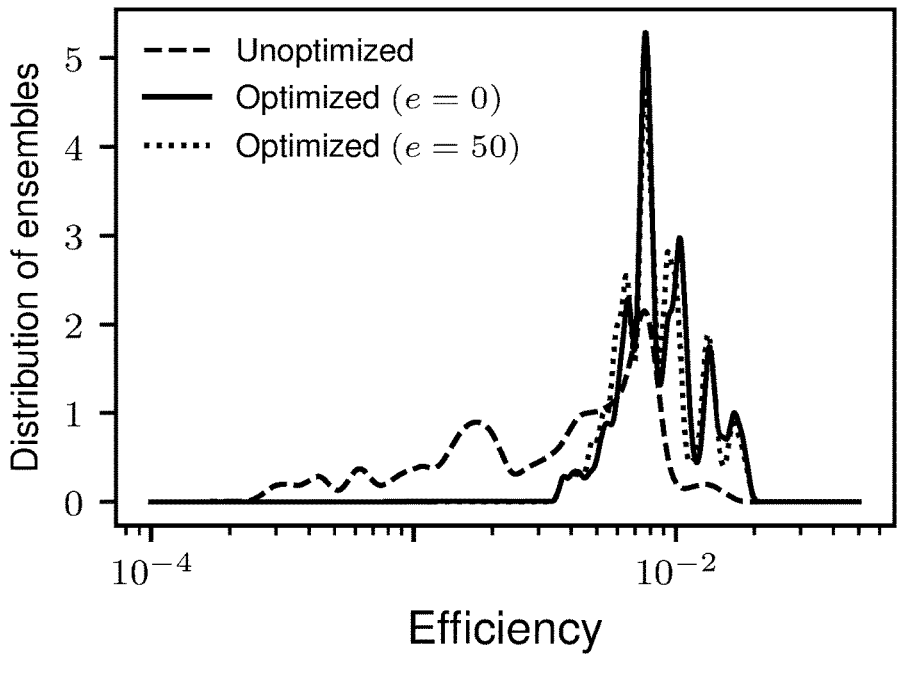
FIGS. 8A-B show the effect of noise on optimized drives.
Figure 8B:
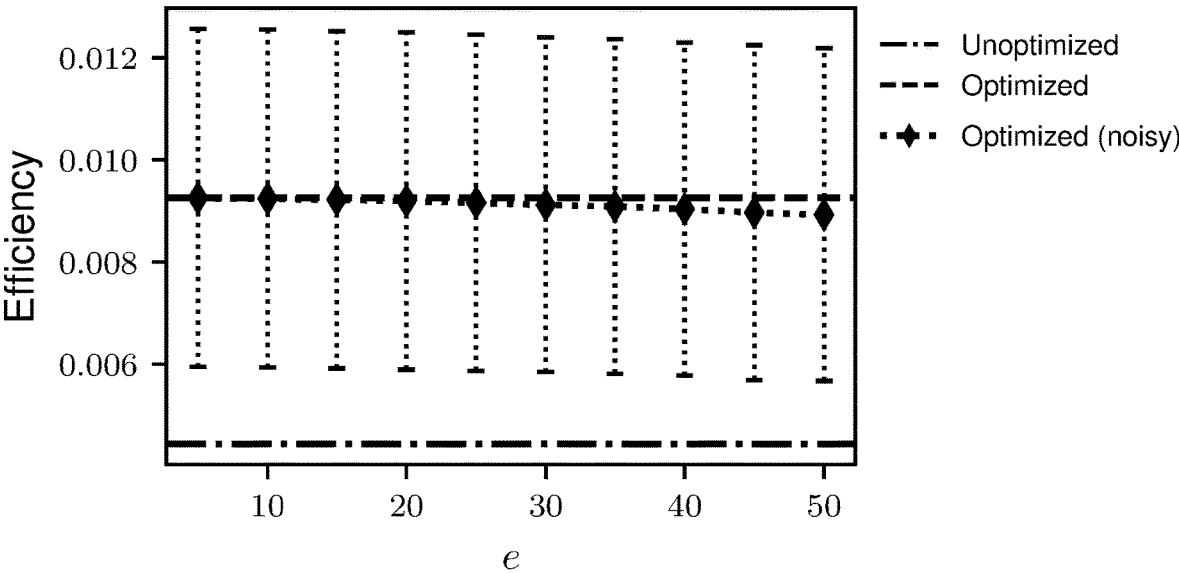

FIGS. 8A-B show the effect of noise on optimized drives. FIG. 8A show density plots (obtained by kernel density estimation using Gaussian kernels) of the transduction efficiency through 100 ensembles with inhomogeneous broadening $\Delta=200\gamma$, C=0.1 for three cases—(dashed line) no optimized drive is applied, (solid line) optimized drives (custom-designed for each of the 100 random ensembles) are applied, (dotted line) noise (e=50) is added to the customized optimized drives. For all cases, the input-photon is frequency-shifted to match the highest peak of the unoptimized transmission spectrum. FIG. 8B shows statistics of the transduction efficiency with increasing noise percentage e in the optimized drive compared with the noiseless optimized and unoptimized cases. Lines denote the mean of the transduction efficiency over 100 ensembles and the error bars denote the standard deviation.

The invention claimed is:

1. A method of making a quantum transducer, the method comprising:

preparing an ensemble of two or more quantum systems, wherein resonance frequencies of the two or more quantum systems differ according to an inhomogeneous broadening of the ensemble;

pumping the ensemble with pump radiation such that a resulting pumped ensemble coherently couples a first electromagnetic mode to a second electromagnetic mode to provide a coherent quantum transducer of the first and second electromagnetic modes; and selecting a time dependence of the pump radiation according to a numerical maximization of steady state transduction efficiency having characteristics of the inhomogeneous broadening of the ensemble as an input;

wherein a free space wavelength of the first electromagnetic mode is in a range from 1 mm to 1 m, and wherein a free space wavelength of the second electromagnetic mode is in a range from 100 nm to 1 mm, whereby the first electromagnetic mode is a microwave mode and the second electromagnetic mode is an optical mode.

2. The method of claim 1, wherein the characteristics of the inhomogeneous broadening of the ensemble include resonant frequencies of each of the quantum systems.

3. The method of claim 1, wherein the characteristics of the inhomogeneous broadening of the ensemble include a probability density function of resonant frequencies of the quantum systems.

4. The method of claim 1, wherein the quantum systems include one or more quantum systems selected from the group consisting of: color centers and rare earth ion dopants.

5. The method of claim 1, wherein the numerical maximization of steady state transduction efficiency is performed in a time-dependent scattering theory framework by maximizing time integrated power in an output optical mode for a specified input microwave mode wave-packet by varying amplitudes and phases of frequency components of the pump radiation.

6. The method of claim 1, wherein the two or more quantum systems are indexed by an integer i and each quantum system includes a V-configuration of three quantum states having distinct energies $$E_g^i, E_\mu^i, E_{opt}^i$$

for a first quantum state, a second quantum state and a third quantum state, respectively.

7. The method of claim 6, wherein $$E_g^i < E_\mu^i \text{ and } E_g^i < E_{opt}^i$$

for each quantum system i, and wherein the pump radiation coherently couples the first quantum state to the second quantum state and coherently couples the first quantum state to the third quantum state for at least one of the quantum systems.

* * * * *